July 24, 1962 H. B. WAGENIUS 3,045,447
ROTARY DEVICE, SUCH AS REFRIGERATING MACHINE OR SIMILAR DEVICE
Filed Feb. 25, 1959 3 Sheets-Sheet 2

INVENTOR.
WAGENIUS, HANS BORJE

INVENTOR.
WAGENIUS, HANS BORJE

BY
*Lawson and Taylor*

United States Patent Office 3,045,447
Patented July 24, 1962

3,045,447
ROTARY DEVICE, SUCH AS REFRIGERATING MACHINE OR SIMILAR DEVICE
Hans Borje Wagenius, Stockholm, Sweden, assignor to Svenska Rotor Maskiner Aktiebolag, Nacka, Sweden, a corporation of Sweden
Filed Feb. 25, 1959, Ser. No. 795,530
Claims priority, application Sweden Feb. 27, 1958
5 Claims. (Cl. 62—172)

The present invention relates to a rotary device, such as a refrigerating machine or similar device. More particularly the present invention is concerned with a rotary device of the helical type provided with at least two co-operating male and female rotors having helical lands and grooves intermeshing with each other, and with a casing having intersecting bores for the rotors and end walls and inlet and outlet openings, in such a manner that the rotors upon their rotation together with the housing form closed expansion chambers, each comprising grooved portions in communication with each other of pairs of co-operating rotors and varying in volume as the rotors revolve.

An expander should be designed to be able to operate with high efficiency at various pressure ratios between the admitted and discharged media. The problem then arising in an expansion machine of the type referred to is due to the fact that the expansion occurs in a confined chamber shut off from the inlet as well as from the outlet so that the pressure ratio, i.e. the built-in pressure ratio of the device, obtained between the medium admitted into the expansion chamber and that discharged therefrom, is not dependent of the absolute pressure prevailing in the inlet and outlet sections of the device, respectively. By varying the dimension of the inlet opening it is possible not only to vary the quantity of the gas flow but as well to vary the dimension of the expansion chamber at the very point of time when this chamber is shut off from the inlet so that the built-in pressure ratio may be changed.

The present invention might conceivably be used in a number of various connections but will be described below as being applied in the cooling system of an aircraft. However, the invention is not limited to this purpose but comprises other applications as well, which may fall within the scope of the patent claims.

In expansion devices designed for instance as for cooling the inlet air of an aircraft a special problem arises from the fact that the actual ratio between the inlet and outlet pressure of the device is not constant but varies with the altitude. At low altitudes this actual pressure ratio amounts approximately to maximum 10:1 depending on the flying-speed whereupon it can increase to approximately 15:1 and then drop as low as 1.5:1.

In view thereof the expansion chamber is provided with a variable inlet opening which according to the invention an increased opening causes the covered axial length of the rotors to decrease and thus a decrease of the built-in pressure ratio and an increase of the volume flow, and a decreased opening causes the covered axial length to increase and thus an increase of the built-in pressure ratio and a decrease of the volume flow.

One means of accomplishing this variable inlet opening consists in using an adjustable slide. A suitable embodiment of such arrangement comprises an axially movable slide which when moved will expose a variable portion of the threads of the rotors. Preferably this slide is provided with two envelope surfaces which closely contact the periphery of each rotor. The end of the slide facing the inlet opening is further equipped with a recess which is provided with two edges one in each of the two envelope surfaces, said edges being parallel with the cams of the rotors and reciprocally displaced along the line of intersection between the envelope surfaces a distance corresponding to the axial distance between two cams engaging each other of the male and female rotors, respectively. According thereto the two grooves between two consecutive lands in each rotor which define an expansion chamber are sealed off against the inlet port at one and the same moment.

The slide may be supported in the device in several manners. If the forces acting upon said slide are relatively small an advantageous solution is to support said slide axially movable on a pin fixed to the casing. Particularly advantageous then is to support the slide on the pin by means of one or more ball bushings. On the other hand if the forces acting upon the slide are relatively great it will prove difficult to shape the pin sufficiently rigid, for which reason in this case the external end of the slide may be supported directly in the casing.

Control of the expansion device should preferably be automatic in relation to the pressure in the inlet, since the pressure in the outlet has to be maintained comparatively constant irrespective of the altitude. Therefore it is an advantage to arrange control means which are directly influenced by the pressure in the inlet of the expansion device. A particularly suitable embodiment may be obtained by allowing the control means to operate in correspondence to the pressure difference between the pressure of the operating medium in the inlet and the pressure of a reference medium, which conveniently may consist of the outside air surrounding the aircraft. The control device comprises preferably a balanced piston, on one side actuated by the operating medium in the inlet and on the other side by the reference medium, while the balancing of the piston is accomplished by means of one or more springs. The piston may, if the control means are designed in a suitable manner be directly connected with the slide, although a gear arrangement designed in one way or other may be required, particularly if the slide is not axially movable but instead thereof a slide arrangement of one or more angularly adjustable slides is substituted.

Another manner of controlling the dimension of the inlet opening is to use a slide adjustable by means of a speed regulating device driven by the expansion device.

The operating medium for the expansion device consists preferably of air supercharged in a compressor which forms an integral part of the aircraft power unit.

The invention will be described more in detail in conjunction with the accompanying drawings in which.

Figure 1:
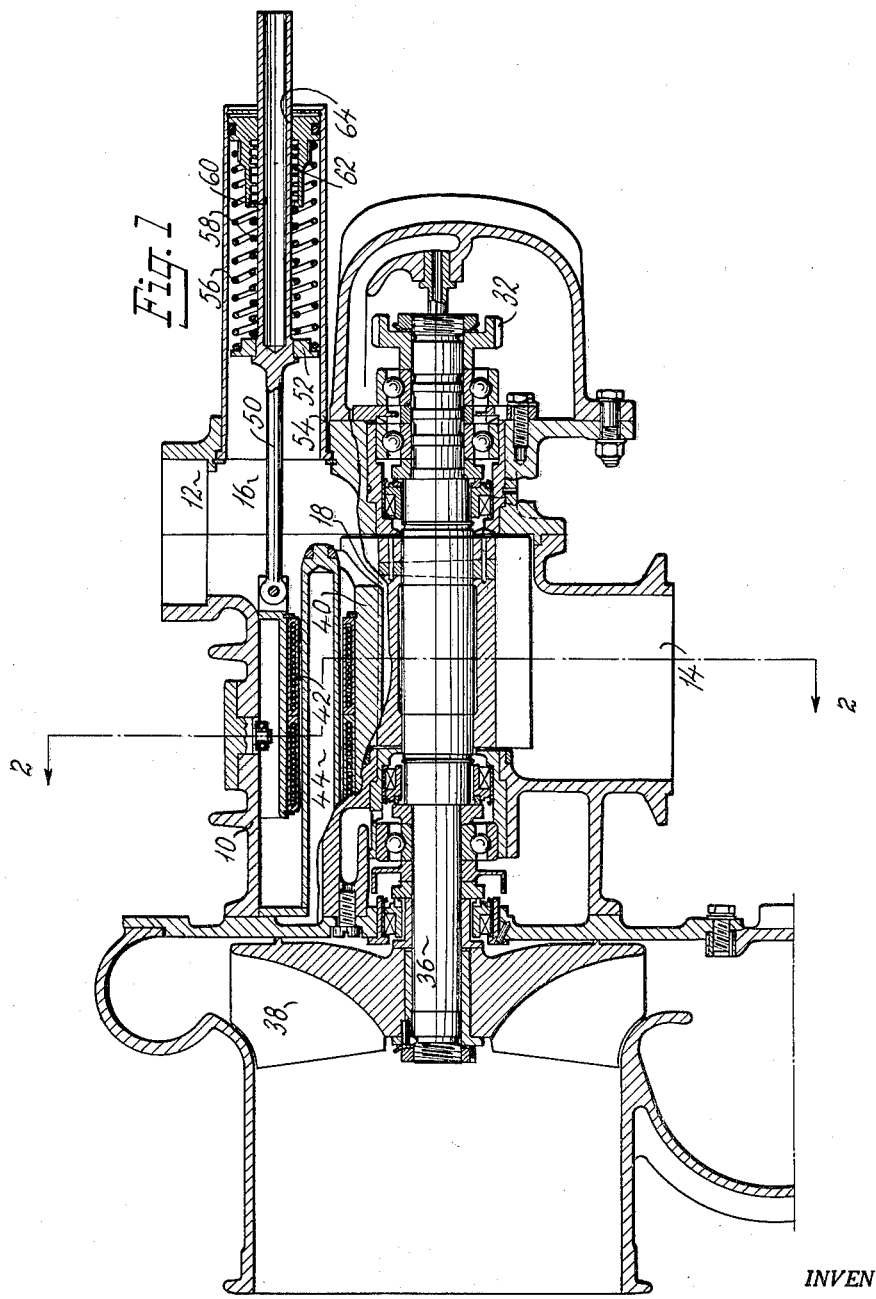
FIG. 1 shows a longitudinal section through one embodiment of the invention along the line 1—1 in FIG. 2.

The housing 10 of the expansion device is provided with an inlet port 12 and an outlet port 14. The operating medium supplied to the inlet port consists suitably of air taken from the compressor of the aircraft power unit, said air prior to the inlet of the expansion machine being passed through a cooler. The air additionally cooled by the expansion is conducted further from the outlet port 14 through conduits to the portions of the aircraft which has to be cooled.

From the inlet port 12 in the housing 10 the operating medium is admitted into an inlet chamber 16 from which it is supplied via an inlet opening 18 to the expansion chambers each comprising two grooves 20, 22 in one male rotor 24 and one female rotor 26, respectively. The male rotor is equipped with four lands 28 located mainly outside the pitch circle of the rotor. The female rotor is in addition equipped with six lands 30, mainly located inside the pitch of the rotor. The lands 28, 30 extend helically along the rotor 24 and 26, respectively, and have rounded profiles which roll off against each other without reciprocal sliding.

As the rotors 24, 26 revolve, the volume of the expansion chambers comprising the grooves is increased, whereby continuous expansion is obtained at the same time as the pressure and temperature of the operating medium is reduced. Each one of the rotors is provided with a synchronizing wheel 32, which wheels engage each other and cause the rotors 24, 26 to revolve in relation to each other without direct reciprocal contact and resultant danger of seizing. Further the male rotor 24 is provided with a shaft end 36 extending through the housing 10 and on which a fan wheel 38 is carried, said fan wheel being intended to brake or unload the power generated in the expansion device.

Figure 2:
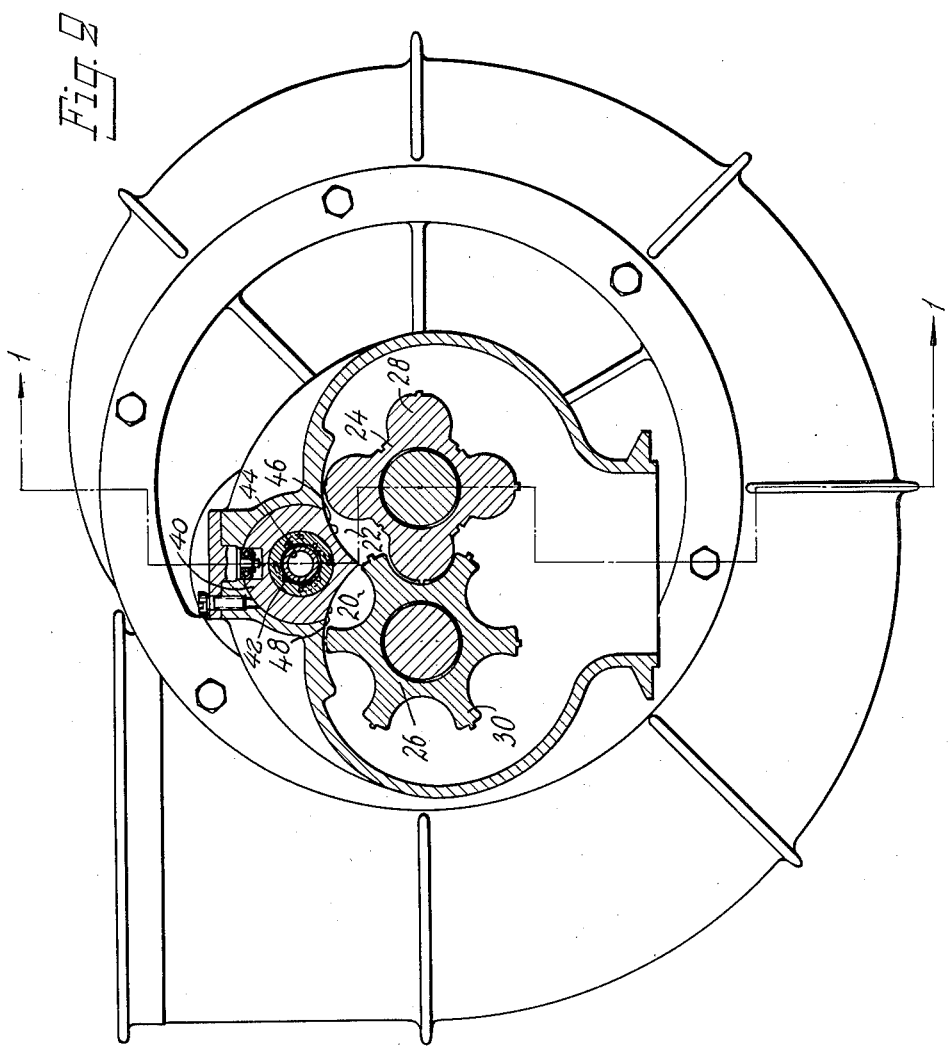
FIG. 2 shows a cross-section through the same embodiment of the invention.

The size of the inlet opening 18 is adjusted by means of an axially movable slide 40 which is carried by means of ball bushings 42 on a pin 44 fixed to the housing. Such a ball bushing consists of a sleeve with a number of closed ball races extending axially and filled with balls. Each ball race consists of one operating part in which the balls are located between the sleeve and the tap enclosed thereby, and one return part in which the balls are entirely enclosed in the sleeve. In FIG. 1 only the return parts of the ball races are shown whereas FIG. 2 shows in section how the various ball race parts are located in relation to each other. The slide 40 is provided with recesses limited by envelope surfaces 46, 48 which closely contact and seal against the periphery of the rotors 24 and 26, respectively.

The slide 40 is directly connected by means of a rod 50 with a supporting ring 52 movably arranged in a cylinder 54 which is closed at one end and at its other end is open to the inlet chamber 16. The supporting ring 52 is not arranged to seal against the cylinder 54 but instead the same pressure is prevailing on both sides of the supporting ring. One end of each of the two springs 56, 58 is contacting the closed end of the cylinder 54. The other end of one 56 of the springs is always contacting the supporting ring 52 whereas the other spring 58 is so short that its other end will contact the supporting ring 52 only when this has been displaced from its position corresponding to the largest inlet opening 18 in direction to decreasing inlet opening. In the position shown in FIG. 1, however, both springs are contacting the supporting ring 52. In doing this the slide will be actuated by one spring only during the first part of its movement and during the latter part of its movement by both springs simultaneously. In addition one or more springs may possibly be arranged to be connected gradually during the movement.

The machine described above will operate in the following manner. Assuming that the atmospheric pressure outside the casing 10 remains constant, as the pressure inside the chamber 16 is increased the piston 60 in FIG. 1 will be forced to the right until the reaction of the springs 56 and 58 balances the force against the piston exerted by the pressure in the chamber. Through the connecting rod 50 the motion of the piston 60 to the right draws the movable slide 40 to the right, covering a greater portion of the rotors with the portion of the slide 40 which forms a part of the cylinder wall. Also, as the slide 40 moves right, the opening 18 is reduced in size. Since a larger portion of the rotors is covered the expansion ratio of the motor is greater due to a greater change in volume of the expansion chamber as it moves between the inlet 18 and the outlet 14. Because of this increased expansion ratio and the reduced area of the inlet 18, the volume of gas fluid moving through the motor will be reduced. Conversely, as the pressure in chamber 16 is reduced, the piston will move to the left causing the slide 40 to move to the left, which in turn reduces the expansion ratio, increases the area of inlet 18 and allows a greater volume of gas to be carried through the motor.

In a refrigeration machine of an aircraft the machine described above will act as follows. Chamber 16 is connected by a conduit to a compressor operated by the airplane power unit. At low altitudes the pressure differential between the chamber 16 and the outside atmosphere is greater than at higher altitudes. Therefore, on the ground the piston 16 and the slide 40 will be forced to the right until balanced by the springs 56 and 58. Hence, as described above, the expansion ratio of the motor will be greater and the volume of gas delivered through the motor will be less. As the altitude increases, the pressure differential between chamber 16 and the atmosphere is reduced so that the piston 60 moves to the left, moving the slide 40 to the left so that the expansion ratio of the motor is less, the inlet opening 18 is greater and a larger volume of gas is delivered through the motor.

The rod 50 is further provided with an extension 60 formed as a piston and pasing through a hole 64 which is provided with seals 62 in the closed end of the cylinder 54. The free end of the extension 60 is influenced by the reference medium pressure prevailing outside the cylinder 54. The extension 60 is designed to a larger diameter than the rod 50 so that due to the different areas the supporting ring 52 is moved in relation to the pressure difference between the pressure in the inlet chamber 16 and the reference medium pressure.

In addition the cylinder 54 and the extension 60 of rod 50 are serving as guides for the springs 56 and 58, respectively.

Figure 3:
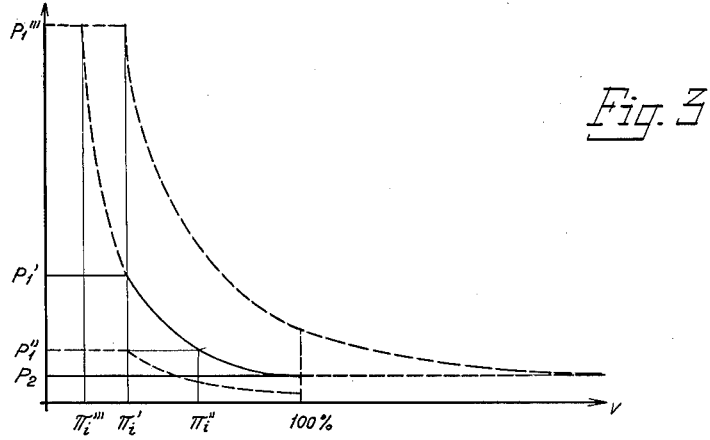
FIG. 3 is a diagram showing the losses when the built-in pressure ratio does not correspond with the actual pressure ratio.

FIG. 3 shows in a pv-diagram in what manner the difference between the built-in pressure ratio and the actual pressure ratio injuriously will influence the mode of the expansion. At a given counter pressure $p_2$ and an inlet volume corresponding to the built-in pressure ratio $\pi_1'$ the operating medium is expanded from the theoretically appropriate inlet pressure $p_1'$ along the continuous line.

If the inlet pressure $p_1''$ is lower than $p_1'$ and the inlet volume corresponds to the built-in pressure ratio $\pi_1'$ the operating medium would expand along the lower dash line. By allowing the expansion instead to commence at an inlet volume corresponding to a built-in pressure ratio $\pi_1''$ an expansion is obtained along the ideally continuous line, giving a higher efficiency and in addition causing a greater gas quantity to pass through the device. The power which has to be consumed by means of the fan will thus increase, which in turn involves a higher engine speed and an additionally increased gas flow.

If the inlet pressure $p_1'''$ is greater than $p_1'$ and the inlet volume corresponds to the built-in pressure ratio $\pi_1'$, the operating medium would expand along the upper dash line. By allowing the expansion instead to commence at an inlet volume corresponding to a built-in pressure ratio $\pi_1'''$ an expansion is obtained along the ideally continuous line involving a higher efficiency and in addition causing a smaller gas quantity to pass through the machine, i.e. that less work need be sacrificed in order to obtain the cooling effect desired.

Figure 4:
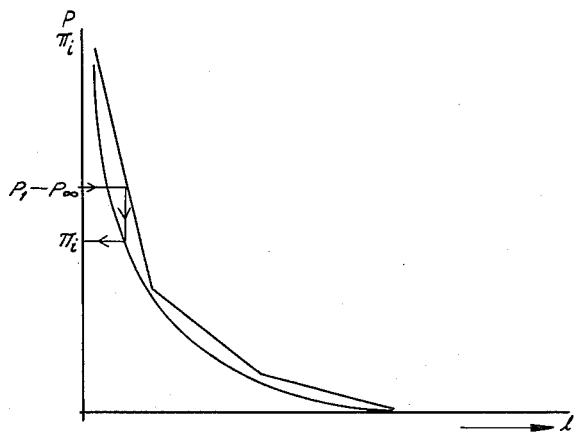
FIG. 4 is a diagram showing in what manner the slide is moved in relation to the pressure difference between the air in the inlet and the surrounding air.

FIG. 4 shows in a diagram by means of the continuous curve in what manner the built-in pressure ratio will vary with the size of the inlet opening. The broken curve shows how the position of the slide actually varies with a control device provided with three springs. With a pressure difference $p_1 - p_\infty$ between the inlet pressure $p_1$ and the reference medium pressure $p_\infty$ the slide is moved to a position corresponding to a built-in pressure ratio $\pi_1$.

Since the counter pressure $p_2$ and the reference medium pressure $p_\infty$ will never substantially exceed 1, corresponding to the pressure at the ground level, the number value of $p_1/p_2$ must always be greater than the number value of $p_1-p_x$. In return the number value of the built-in pressure ratio $\pi_1$ can never exceed the number value of $p_1-p_\infty$, when the control device has been designed in accordance with the diagram in FIG. 4. Therefore the actual pressure ratio $p_1/p_2$ can never be less than the built-in pressure ratio $\pi_1$ with such a control device.

Figure 5:
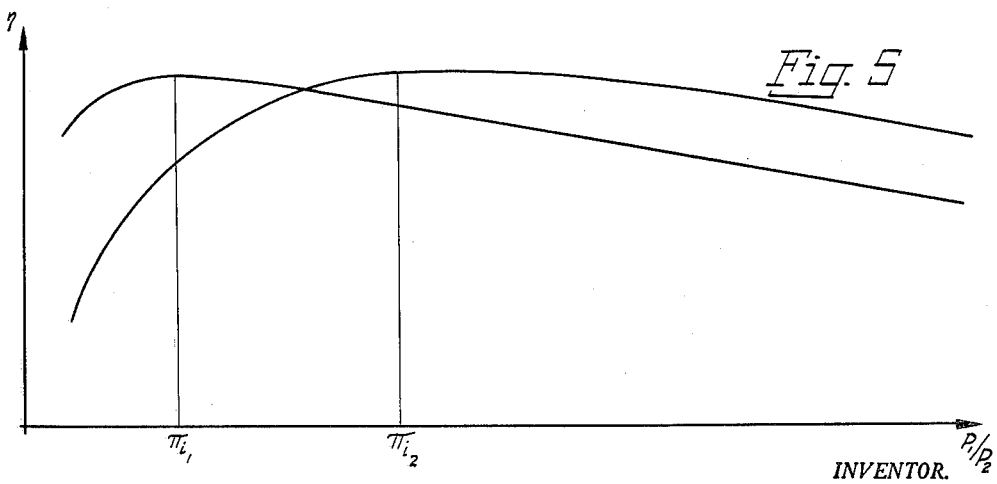
FIG. 5 is a diagram showing in what manner the efficiency will vary with the actual pressure ratio in expansion machines of two differently built-in pressure ratios.

FIG. 5 shows two efficiency curves dependent of the actual pressure ratio for expansion devices of present type with different built-in pressure ratios. It is evident from these curves that the efficiency subsides considerably quicker at a too low actual pressure ratio than at a too high actual pressure ratio, for which reason it is desirable to have a somewhat too high actual pressure ratio rather than a too low ratio in devices of the present type, as is evident from FIG. 4, is the ratio obtained in the present design of control device. The diagram of FIG. 5 also shows that in case the number value of $p_1/p_2$ considerably exceeds the number value of $p_1-p_\infty$ which occurs at high altitudes, then the efficiency in spite of this is still acceptable.

The invention is not limited to the shown device but embraces all those coming within the scope of the accompanying claims.

What I claim is:

1. In a rotary screw type pump having a casing structure providing intersecting cylindrical bores having parallel axes and high pressure and low pressure openings communicating with said bores and having a pair of helically ribbed rotors disposed in said bores to rotate in intermeshed relation in said bores and to co-operate with each other and with the walls of said bores in a manner to sealingly separate the high pressure and low pressure openings to form variable volume chambers defined by the walls of said bores and the surfaces of said rotors, said chambers being in communication alternately with the high pressure opening and with the low pressure opening as the rotors rotate, the improvement comprising a sliding member disposed in said casing, said sliding member forming a portion of the inner walls of said bores adjacent one of said openings and defining in part the size of said opening, means for adjusting said member in one direction to reduce the area of the bore walls in contact with the rotors to increase the size of said opening adjacent said member and for adjusting said member in the opposite direction to increase the area of the bore walls in contact with the rotors to reduce the size of said opening adjacent said member, said means for adjusting the sliding member includes means responsive to changes in pressure at the opening adjacent the sliding member.

2. In a rotary screw type pump having a casing structure providing intersecting cylindrical bores having parallel axes and high pressure and low pressure openings communicating with said bores and having a pair of helically ribbed rotors disposed in said bores to rotate in intermeshed relation in said bores and to co-operate with each other and with the walls of said bores in a manner to sealingly separate the high pressure and low pressure openings to form variable volume chambers defined by the walls of said bores and the surfaces of said rotors, said chambers being in communication alternately with the high pressure opening and with the low pressure opening as the rotors rotate, the improvement comprising a sliding member disposed in said casing, said sliding member forming a portion of the inner walls of said bores adjacent one of said openings and defining in part the size of said opening, means for adjusting said member in one direction to reduce the area of the bore walls in contact with the rotors to increase the size of said opening adjacent said member and for adjusting said member in the opposite direction to increase the area of the bore walls in contact with the rotors to reduce the size of said opening adjacent said member, said means for adjusting the sliding member includes means responsive to changes in the pressure differential between the inside of the casing at the opening adjacent the sliding member and a reference pressure system outside the casing.

3. The improvement defined in claim 2 wherein said pressure responsive means for adjusting the sliding member comprises a sliding piston which reciprocates responsive to changes in the pressure differential between the inside of the casing at the opening adjacent the slide and the reference pressure outside the casing, and means for operating the sliding member in response to reciprocal motion of the piston.

4. The improvement defined in claim 3 wherein the pressure responsive motion of the sliding piston is balanced by springs attached to the piston in a manner to balance the pressure differential.

5. The improvements defined in claim 2, said pressure responsive means for adjusting the sliding member includes means responsive to the atmospheric pressure.

References Cited in the file of this patent

UNITED STATES PATENTS

| | | |
|---|---|---|
| 678,570 | Jones | July 16, 1901 |
| 996,169 | Van Deventer | June 27, 1911 |
| 2,425,000 | Paget | Aug. 5, 1947 |
| 2,477,004 | Paget | July 26, 1949 |
| 2,585,570 | Messenger et al. | Feb. 12, 1952 |
| 2,656,972 | Rathman | Oct. 27, 1953 |
| 2,808,813 | Lindhagen | Oct. 8, 1957 |
| 2,896,903 | Canalizo | July 28, 1959 |